United States Patent
Kinoshita et al.

(10) Patent No.: US 8,634,693 B2
(45) Date of Patent: Jan. 21, 2014

(54) RECORDING APPARATUS, RECORDING STATUS DETECTION METHOD, PROGRAM DELIVERY AND RECORDING SYSTEM, AND PROGRAM

(75) Inventors: Akihiko Kinoshita, Tokyo (JP); Takashi Kanao, Tokyo (JP); Hiroyuki Chiba, Kanagawa (JP); Tsuyoshi Honma, Chiba (JP); Hirofumi Kouda, Saitama (JP)

(73) Assignee: Sony Corporation (JP)

(*) Notice: Subject to any disclaimer, the term of this patent is extended or adjusted under 35 U.S.C. 154(b) by 948 days.

(21) Appl. No.: 12/387,080

(22) Filed: Apr. 28, 2009

(65) Prior Publication Data

US 2009/0274448 A1    Nov. 5, 2009

(30) Foreign Application Priority Data

Apr. 30, 2008 (JP) ................. P2008-119341

(51) Int. Cl.
*H04N 5/765* (2006.01)
*H04N 5/931* (2006.01)

(52) U.S. Cl.
USPC .......................... 386/200; 386/204

(58) Field of Classification Search
None
See application file for complete search history.

(56) References Cited

U.S. PATENT DOCUMENTS

| 7,900,228 B2* | 3/2011 | Stark et al. ............... 725/45 |
| 2008/0063381 A1* | 3/2008 | Conroy et al. ............. 386/124 |
| 2010/0014830 A1* | 1/2010 | Jang ........................ 386/83 |

FOREIGN PATENT DOCUMENTS

| JP | 2005-286388 A | 10/2005 |
| JP | 2006-094203 A | 4/2006 |
| JP | 2007-235193 A | 9/2007 |
| JP | 2008-085515 A | 4/2008 |

* cited by examiner

*Primary Examiner* — William C Vaughn, Jr.
*Assistant Examiner* — Oluwaseun A Adegeye
(74) *Attorney, Agent, or Firm* — Lerner, David, Littenberg, Krumholz & Mentlik, LLP

(57) ABSTRACT

A recording apparatus includes: a guide information obtaining section to obtain guide information of a program scheduled to be delivered; a series information obtaining section to obtain series information for specifying a plurality of programs belonging to a series; a program data obtaining section to obtain data of the programs; a program data storage section capable of storing the data of the programs; a program data recording section to store the data of the programs obtained by the program data obtaining section in the program data storage section; a recording history storage section to store information about the programs whose data is stored in the program data storage section, as recording history information; and a detection section to detect a recording status of at least one program belonging to the series intended to be recorded based on the guide information, the series information, and the recording history information.

7 Claims, 9 Drawing Sheets

RECORDING APPARATUS, RECORDING STATUS DETECTION METHOD, PROGRAM DELIVERY AND RECORDING SYSTEM, AND PROGRAM

The present application claims priority from Japanese Patent Application No. JP 2008-119341, filed in the Japanese Patent Office on Apr. 30, 2008, the entire content of which is incorporated herein by reference.

BACKGROUND OF THE INVENTION

1. Field of the Invention

The present invention relates to a recording apparatus that can obtain, for example, broadcast programs, video-on-demand (VOD) programs, and so forth and record the obtained programs and to a recording status detection method, a program delivery and recording system, and a program that allow recording statuses of programs of the recording apparatus to be detected.

2. Description of the Related Art

Recent years, recording apparatuses that can record/reproduce data of programs and contents delivered through various types of transmission media to/from recording media having a large capacity such as a hard disk drive (HDD), a digital versatile disc (DVD), and a Blu-ray disc have become common. Delivery systems for programs and contents are diversified, and examples thereof include a delivery system that uses broadcast radio waves as a transmission medium, such as a terrestrial analog broadcast, a terrestrial digital broadcast, a BS broadcast, and a CS broadcast, and a delivery system that uses a network as a transmission medium, such as an IP multicast system and a video-on-demand (VOD) system.

As services that provide guide information of programs scheduled to be delivered to the user, an electronic program guide (EPG), an electronic content guide (ECG), and so forth are used. Such program guide information contains guide information of programs scheduled to be delivered in the several weeks to come.

A recording apparatus obtains such program guide information and stores it periodically or whenever the power of the apparatus is turned on. In response to a user's request, the recording apparatus causes a display section of an external AV device or the like connected to the recording apparatus to display the stored program guide information. If a program that the user wishes to view is found, with reference to the displayed program guide information, the user selects that program and performs timer-recording or the like for the selected program.

Programs categorized as dramas tend to be a series of programs that are broadcast daily or weekly, for example. It is generally the case that the user wishes to view such a series of programs from Episode 1 to a final episode.

For example, Japanese Patent Application Laid-open No. 2007-235193 (paragraph [0035]) (hereinafter, referred to as Patent Document 1) discloses a recording apparatus that can automatically determine a series of programs and perform timer-recording on programs determined as being the series of programs. This recording apparatus automatically determines programs that are broadcast at predetermined intervals as a series of programs based on EPG data and program recording history, and automatically records the programs as a series of programs to be timer-recorded based on EPG data.

SUMMARY OF THE INVENTION

However, broadcasting schedules of programs are changed frequently. Thus, since the recording apparatus disclosed as Patent Document 1 automatically determines whether or not programs are a series of programs based on periodicities of broadcasting schedules of programs, if the broadcasting schedules of programs are frequently changed, it is difficult for the recording apparatus to correctly determine whether or not the programs are a series of programs.

Nowadays, a variety of program delivery systems co-exist. Programs of the same series may be asynchronously delivered according to a plurality of different delivery systems. For example, there are cases where, while a certain series of programs are delivered periodically by a certain broadcasting wave, the same series of programs are periodically delivered by a different broadcasting wave at a different schedule, or the programs are delivered using the VOD system.

In this situation, if the user intending to record a series of programs delivered according to a predetermined delivery system has failed to record a particular episode within the series, even if the same episode is scheduled to be delivered according to another delivery system, it is difficult for the user to grasp the schedule.

In view of the foregoing, it is desirable to provide a recording apparatus, a recording status detection method, a program delivery and recording system, and a program that are capable of favorably recording a series of programs.

According to an embodiment of the present invention, there is provided a recording apparatus including a guide information obtaining means, a series information obtaining means, a program data obtaining means, a program data storage section, a program data recording means, a recording history storage section, and a detection means. The guide information obtaining means obtains guide information of a program scheduled to be delivered. The series information obtaining means obtains series information for specifying a plurality of programs which belong to a series. The program data obtaining means obtains data of each of the plurality of programs. The program data storage section is capable of storing the data of each of the plurality of programs. The program data recording means stores the data of each of the plurality of programs obtained by the program data obtaining means in the program data storage section. The recording history storage section stores information about each of the plurality of programs whose data is stored in the program data storage section, as recording history information. The detection means detects a recording status of at least one of the plurality of programs which belong to the series intended to be recorded based on the guide information obtained by the guide information obtaining means, the series information obtained by the series information obtaining means, and the recording history information stored in the recording history storage section.

According to the embodiment of the present invention, by detecting a recording status of at least one program that belongs to a series that the user intends to record based on the guide information of the program, series information that specifies a plurality of programs that belong to the series, and recording history information, the series of programs can favorably be recorded without being influenced by changes of a broadcast schedule or delivery schedule of the programs.

In the recording apparatus according to the embodiment of the present invention, the guide information obtaining means may obtain the guide information according to a plurality of different delivery systems, the program data obtaining means may be capable of obtaining the data of each of the plurality of programs according to the plurality of delivery systems, and the detection means may detect the recording status of at least one of the plurality of programs which belong to the series intended to be recorded based on the guide information according to the plurality of delivery systems obtained by the guide information obtaining means, the series information obtained by the series information obtaining means, and the recording history information stored in the recording history storage section.

According to the embodiment of the present invention, a recording status of at least one program that belongs to a series as a viewing target can be detected for the plurality of different delivery systems. Thus, even if the user intending to successively record the series of programs scheduled to be delivered according to a predetermined delivery system has failed to record a particular episode, when the same episode is scheduled to be delivered according to another delivery system, the user can be notified of the schedule.

The recording apparatus according to the embodiment of the present invention may further include a reproduction means for reproducing the data of each of the plurality of programs stored in the program data storage section, and a viewing history storage section to store information about the data of each of the plurality of programs reproduced by the reproduction means as viewing history information. In this case, the detection means may further detect a viewing status of at least one of the plurality of programs which belong to the series intended to be recorded based on the guide information according to the plurality of delivery systems obtained by the guide information obtaining means, the series information obtained by the series information obtaining means, and the recording history information stored in the recording history storage section.

According to the embodiment of the present invention, a viewing history of programs that belong to a series can be detected along with a recording history thereof.

In the recording apparatus according to the embodiment of the present invention, the detection means may further output information about a program that has been neither recorded nor viewed from among at least one of the plurality of programs which belong to the series intended to be recorded based on a result of the detection.

In the recording apparatus according to the embodiment of the present invention, the detection means may output information about a program which has been recorded but not yet viewed from among at least one of the plurality of programs which belong to the series intended to be recorded based on the result of the detection.

According to another embodiment of the present invention, there is provided a recording status detection method including: obtaining guide information of a program scheduled to be delivered; obtaining series information for specifying a plurality of programs which belong to a series; obtaining data of each of the plurality of programs; storing the obtained data of each of the plurality of programs in a program data storage section; storing information about each of the plurality of programs whose data is stored in the program data storage section, as recording history information; and detecting a recording status of at least one of the plurality of programs which belong to the series intended to be recorded based on the guide information, the series information, and the recording history information that have been obtained.

According to another embodiment of the present invention, there is provided a program delivery and recording system including a program delivery apparatus, a guide information delivery apparatus, a series information delivery apparatus, and a recording apparatus. The program delivery apparatus is capable of delivering data of a program. The guide information delivery apparatus is capable of delivering guide information of a program scheduled to be delivered. The series information delivery apparatus is capable of delivering series information for specifying a plurality of programs which belong to a series. The recording apparatus is capable of recording the data of each of the plurality of programs delivered from the program delivery apparatus, and includes a guide information obtaining means, a series information obtaining means, a program data obtaining means, a program data storage section, a program data recording means, a recording history storage section, and a detection means. The guide information obtaining means obtains the guide information delivered from the guide information delivery apparatus. The series information obtaining means obtains the series information delivered from the series information delivery apparatus. The program data obtaining means obtains data of each of the plurality of programs delivered from the program delivery apparatus. The program data storage section is capable of storing the data of each of the plurality of programs. The program data recording means stores the data of each of the plurality of programs obtained by the program data obtaining means in the program data storage section. The recording history storage section stores information about each of the plurality of programs whose data is stored in the program data storage section, as recording history information. The detection means detects a recording status of at least one of the plurality of programs which belong to the series intended to be recorded based on the guide information obtained by the guide information obtaining means, the series information obtained by the series information obtaining means, and the recording history information stored in the recording history storage section.

According to another embodiment of the present invention, there is provided a program causing a computer to operate as a guide information obtaining means, a series information obtaining means, a program data obtaining means, a program data storage section, a program data recording means, a recording history storage section, and a detection means. The guide information obtaining means obtains guide information of a program scheduled to be delivered. The series information obtaining means obtains series information for specifying a plurality of programs which belong to a series. The program data obtaining means obtains data of each of the plurality of programs. The program data storage section is capable of storing the data of each of the plurality of programs. The program data recording means stores the data of each of the plurality of programs obtained by the program data obtaining means in the program data storage section. The recording history storage section stores information about each of the plurality of programs whose data is stored in the program data storage section, as recording history information. The detection means detects a recording status of at least one of the plurality of programs which belong to the series intended to be recorded based on the guide information obtained by the guide information obtaining means, the series information obtained by the series information obtaining means, and the recording history information stored in the recording history storage section.

As described above, according to the embodiments of the present invention, a series of programs can be recorded favorably.

These and other objects, features and advantages of the present invention will become more apparent in light of the following detailed description of best mode embodiments thereof, as illustrated in the accompanying drawings.

DESCRIPTION OF PREFERRED EMBODIMENTS

Next, with reference to the accompanying drawings, an embodiment of the present invention will be described.

Figure 1:
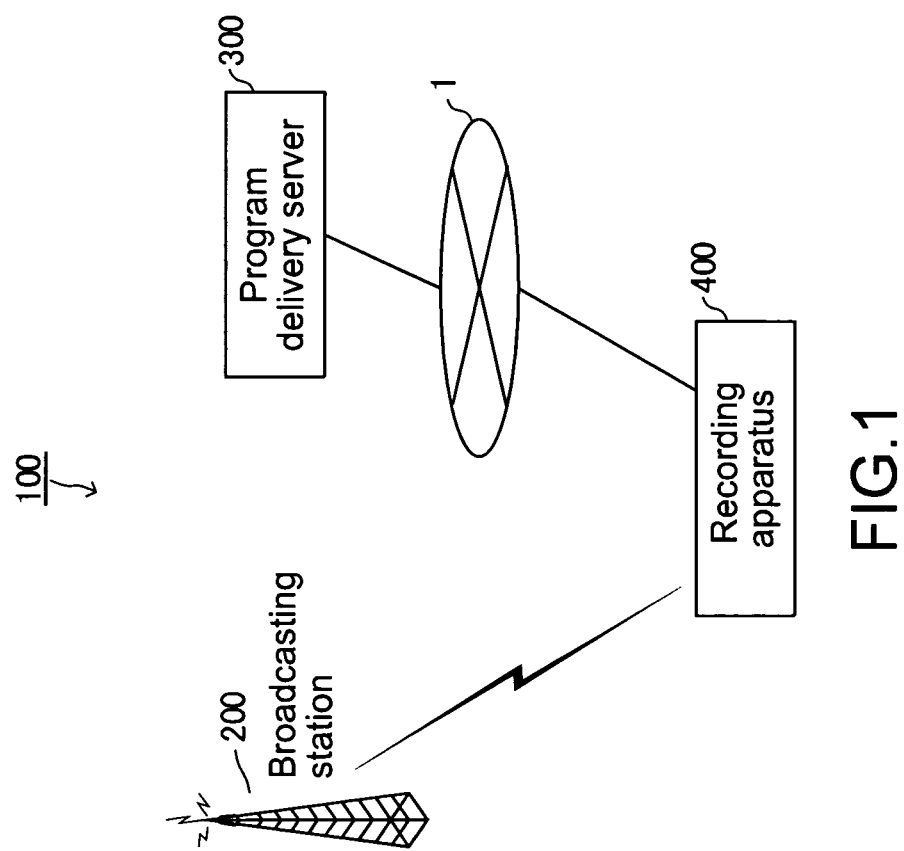
FIG. 1 is a diagram showing a structure of a program delivery and recording system according to an embodiment of the present invention.

FIG. 1 is a diagram showing a structure of a program delivery and recording system 100 according to an embodiment of the present invention.

As shown in FIG. 1, the program delivery and recording system 100 includes a broadcasting station 200, a program delivery server 300, and a recording apparatus 400. The program delivery server 300 and the recording apparatus 400 can be connected to each other through a network 1 such as the Internet. The recording apparatus 400 may be connected to a home network connected to the network 1 through an edge router.

The broadcasting station 200 delivers data of a program and an electric program guide (EPG) as program guide information using broadcast radio waves. In addition, the broadcasting station 200 delivers, for each series of programs, series information for specifying a plurality of programs that belong to that series.

The program delivery server 300 can deliver data of a program and an electric content guide (ECG) as program guide information through the network 1 according to an IP multicast system, a VOD system, or the like. In addition, the program delivery server 300 can deliver, for each series of programs, series information for specifying a plurality of programs that belong to that series.

In this embodiment, the broadcasting station 200 and the program delivery server 300 each operate as a "program delivery apparatus", a "guide information delivery apparatus", and a "series information delivery apparatus". The broadcasting station 200 and the program delivery server 300 are program delivery apparatuses that can deliver data of programs using mutually different delivery systems. It is also possible to deliver data of a program, guide information of the program, and series information from different apparatuses, or deliver only the series information from a dedicated apparatus.

The recording apparatus 400 is an apparatus that can record data of programs broadcast from the broadcasting station 200 and data of programs delivered from the program delivery server 300, and reproduce the recorded program data. The recording apparatus 400 can also receive the EPG and the series information from the broadcasting station 200 and the ECG and the series information from the program delivery server 300 and store these pieces of information.

Next, a structure of the recording apparatus 400 will be described.

Figure 2:
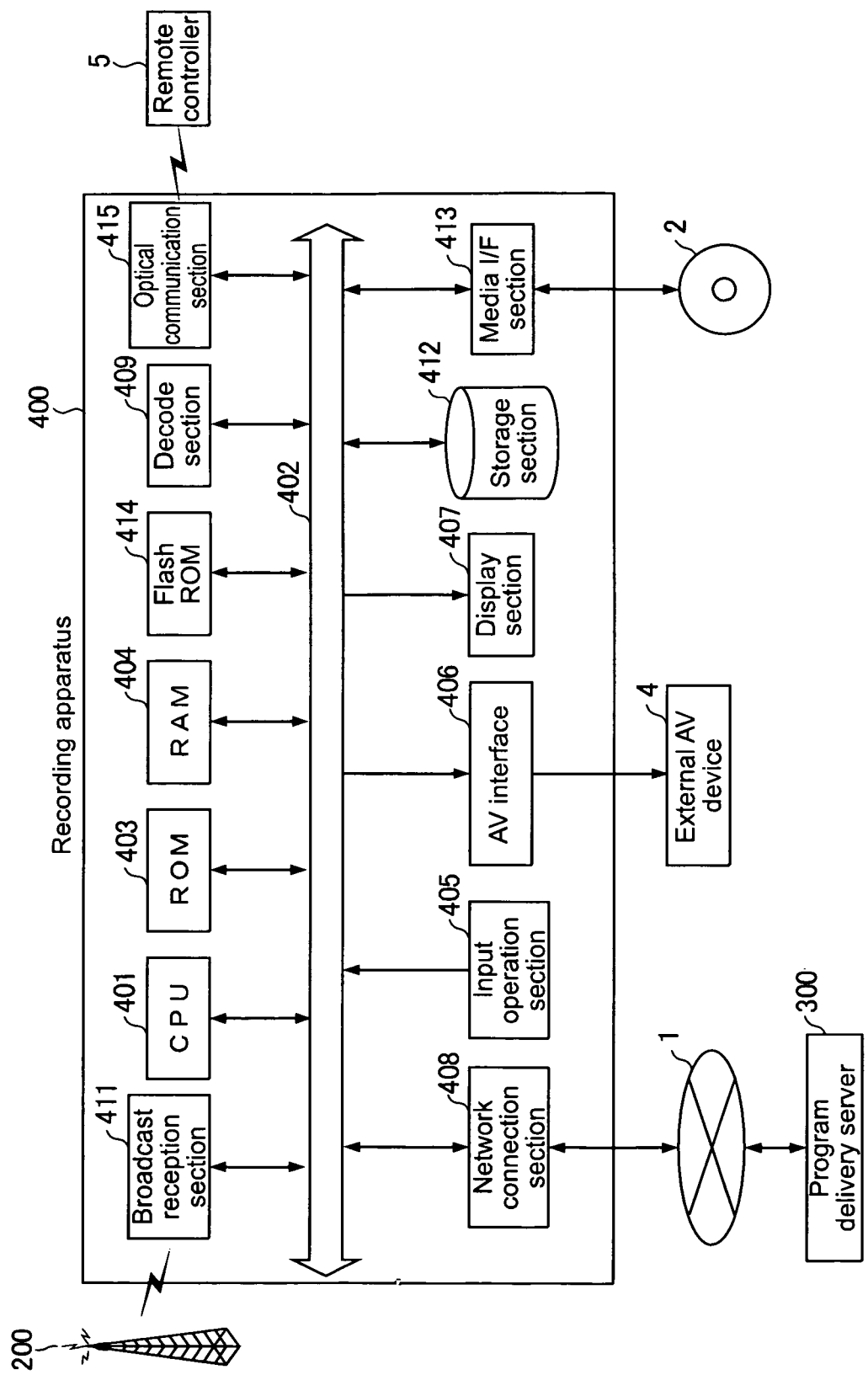
FIG. 2 is a diagram showing a structure of hardware of a recording apparatus.

FIG. 2 is a diagram showing a hardware structure of the recording apparatus 400.

As shown in FIG. 2, connected to a CPU 401 through a system bus 402 are a ROM 403, a RAM 404, an input operation section 405, an AV interface 406, a display section 407, a network connection section 408, a decode section 409, a broadcast reception section 411, a storage section 412 composed of, for example, a hard disc drive (HDD), a media interface section 413, a flash ROM 414, an optical communication section 415, and so forth.

The ROM 403 and the flash ROM 414 store programs and various types of data processed and executed by the CPU 401. The flash ROM 414 can store various types of data. The RAM 404 is used as a temporary working area and temporary data storage area for the CPU 401.

The input operation section 405 has various keys and so forth and processes inputs of commands for various operations from the user. Commands that are input from the input operation section 405 are sent to the CPU 401 through the system bus 402.

The optical communication section 415 is an interface through which the recording apparatus 400 communicates with a remote controller 5. Like the input operation section 405, the remote controller 5 has various keys and so forth. The remote controller 5 processes the inputs of commands for various operations from the user, converts the input signals into optical signals, and transmits them to the optical communication section 415. The optical communication section 415 receives the optical signals from the remote controller 5, converts them into electric signals, and outputs the electric signals to the CPU 401 through the system bus 402.

The display section 407 includes a display device such as a liquid crystal display (LCD) and a display control circuit that drives the display device. The display section 407 prompts the user to confirm commands and data that the user has input and displays various types of statuses.

The network connection section 408 is an interface that processes the connection with the network 1 such as the Internet or a home network connected to the Internet through a router.

The AV interface 406 processes inputs and outputs of video signals and audio signals with respect to an external AV device 4 such as a television set connected to the recording apparatus 400.

The broadcast reception section 411 receives broadcast waves of, for example, a terrestrial analog television broadcast, a terrestrial digital television broadcast, a CS digital broadcast, a BS digital broadcast, and a terrestrial digital television broadcast for mobile devices from the broadcasting station 200 and performs demodulations of the video signals and audio signals and other processes.

The decode section 409 decodes program data that has been compression-encoded for transmission and recording. Video data and audio data that have been decoded and restored by the decode section 409 are output to the external AV device 4 such as a television set through the AV interface 406.

The storage section 412 is composed of, for example, an HDD, and stores program data, an EPG, and series information delivered through broadcast waves from the broadcasting station 200, program data, an ECG, and series information delivered from the program delivery server 300 through the network 1, and so forth.

The media interface section 413 is an interface to which or from which a removable medium 2 such as a digital versatile disc (DVD), a Blu-ray disc, and a flash memory can be attached or detached. Program data can be written to and read from the removable medium 2 mounted to the media interface section 413.

Figure 3:
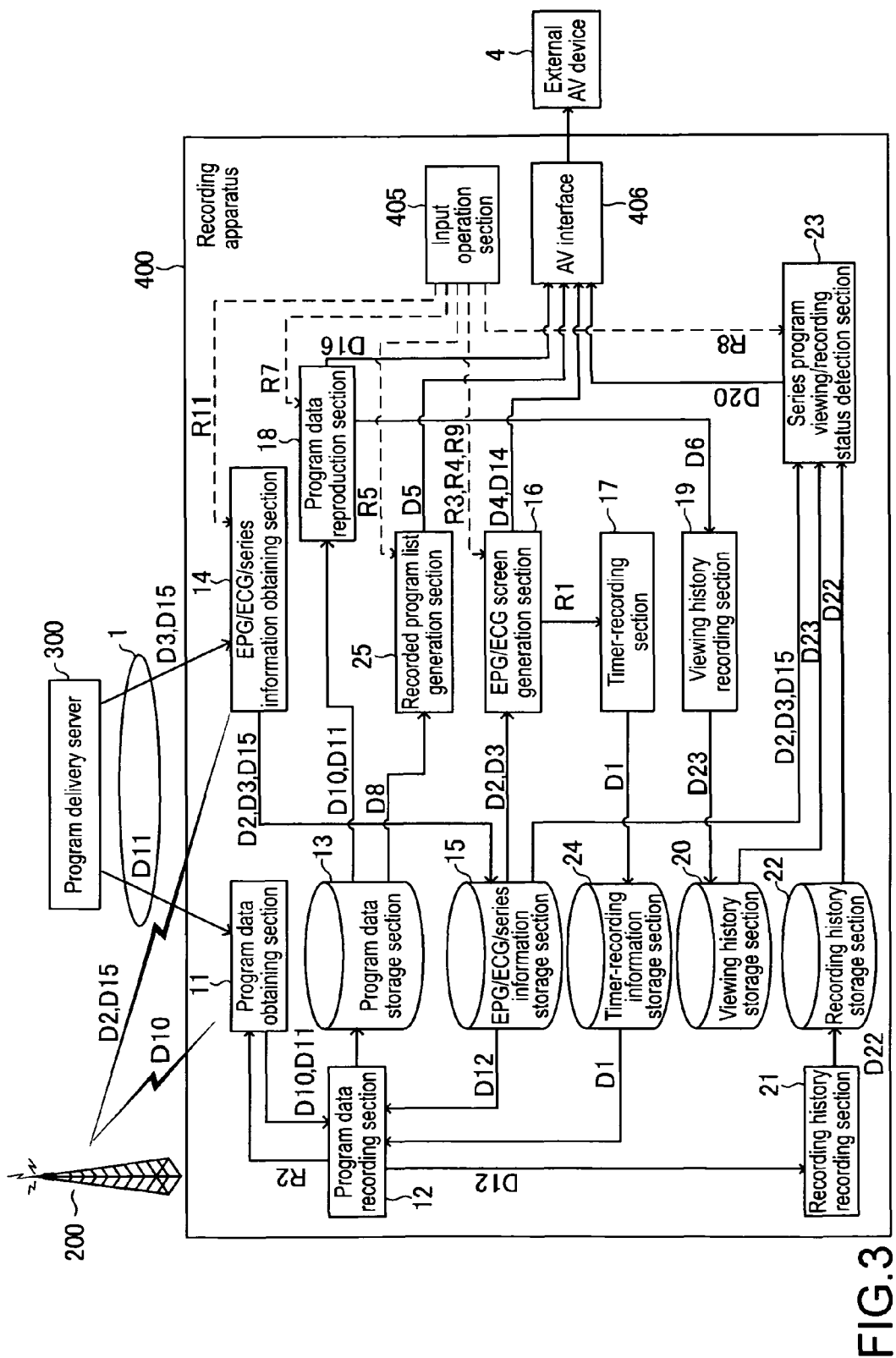
FIG. 3 is a diagram showing a functional structure of the recording apparatus.

FIG. 3 is a diagram showing a functional structure of the recording apparatus 400.

As shown in FIG. 3, the recording apparatus 400 includes a program data obtaining section 11, a program data recording section 12, a program data storage section 13, an EPG/ECG/series information obtaining section 14, an EPG/ECG/series information storage section 15, an EPG/ECG screen generation section 16, a timer-recording section 17, a program data reproduction section 18, a viewing history recording section 19, a viewing history storage section 20, a recording history recording section 21, a recording history storage section 22, a series program viewing/recording status detection section 23, a timer-recording information storage section 24, and a recorded program list generation section 25.

The program data obtaining section 11 controls the broadcast reception section 411 to perform processes of obtaining program data from the outside, such as receiving program data D10 broadcast from the broadcasting station 200 and receiving program data D11 delivered from the program delivery server 300 through the network 1 according to the IP multicast system or the VOD system.

The program data recording section 12 performs processes of storing the program data D10 and D11 obtained by the program data obtaining section 11 in the program data storage section 13. The program data recording section 12 issues a program obtaining request R2 to the program data obtaining section 11 based on timer-recording information D1 stored in, for example, the timer-recording information storage section 24, and stores the program data D10 and D11 as a response to the request in the program data storage section 13.

The program data storage section 13 stores not only the program data D10 and D11, but also a table that manages them. Specifically, the program data storage section 13 includes the storage section 412, the removable medium 2 mounted to the media interface section 413, the flash ROM 414, and so forth.

Based on an obtaining request R11 that the user has input using the input operation section 405 or the remote controller 5, the EPG/ECG/series information obtaining section 14 controls the broadcast reception section 411 to receive EPG data D2 and series information D15 delivered from the broadcasting station 200 through broadcast waves, or controls the network connection section 408 to receive ECG data D3 and series information D15 delivered from the program delivery server 300 through the network 1, and stores the obtained data and information in the EPG/ECG/series information storage section 15.

The EPG/ECG/series information storage section 15 stores the EPG data D2, the ECG data D3, and the series information D15. Specifically, the EPG/ECG/series information storage section 15 includes the storage section 412, the removable medium 2 mounted to the media interface section 413, the flash ROM 414, and so forth.

The EPG/ECG screen generation section 16 generates screen data D4 and D14 respectively from the EPG data D2 and the ECG data D3 stored in the EPG/ECG/series information storage section 15 based on a display request R3 that the user has input using the input operation section 405 or the remote controller 5.

The timer-recording section 17 performs a process of registering the timer-recording information D1 to the timer-recording information storage section 24.

The timer-recording information storage section 24 stores the timer-recording information D1. Specifically, the timer-recording information storage section 24 includes the storage section 412, the removable medium 2 mounted to the media interface section 413, the flash ROM 414, and so forth.

The recorded program list generation section 25 generates a recorded program list D5 that is list data of recorded programs from table information D8 for managing the program data D10 and D11 stored in the program data storage section 13, based on a recorded program list output request R5 that the user has input using the input operation section 405 or the remote controller 5. The recorded program list D5 generated by the recorded program list generation section 25 is output to the external AV device 4 such as a television set through the AV interface 406. The user can select a program that he or she wishes to view from the recorded program list displayed on the external AV device 4 and input a program viewing request R7 corresponding to the selected program using the input operation section 405 or the remote controller 5.

The program data reproduction section 18 causes the decode section 409 to decode the program data D10 and D11 read out from the program data storage section 13, and outputs video data and audio data as reproduction data D16 to the external AV device 4 through the AV interface 406.

The viewing history recording section 19 performs processes of obtaining reproduction completion notification D6 including information on a delivery system, a program ID, a program name, a viewed date/time, and so forth of a program reproduced by the program data reproduction section 18, and storing these pieces of information contained in the reproduction completion notification D6 in the viewing history storage section 20 as viewing history information D23.

The viewing history storage section 20 stores the viewing history information D23 of the program reproduced by the program data reproduction section 18. Specifically, the viewing history storage section 20 includes the storage section 412, the removable medium 2 mounted to the media interface section 413, the flash ROM 414, and so forth.

The recording history recording section 21 performs processes of obtaining program information D7 such as a program ID of a program recorded in the program data storage section 13 by the program data recording section 12, extracting information D12 about a relevant program from the EPG data D2 and the ECG data D3 stored in the EPG/ECG/series information storage section 15 based on the program information D7, and storing the information D12 about the program in the recording history storage section 22 as recording history information D22.

The recording history storage section 22 stores the recording history information D22 of recorded programs. Specifically, the recording history storage section 22 includes the storage section 412, the removable medium 2 mounted to the media interface section 413, the flash ROM 414, and so forth.

When the user inputs a series program viewing/recording status referral request R8 using the input operation section 405 or the remote controller 5, the series program viewing/recording status detection section 23 detects a viewing status and a recording status of at least one program that belongs to a series that the user intends to record based on the viewing history information D23 stored in the viewing history storage section 20, the recording history information D22 stored in the recording history storage section 22, and the EPG data D2, the ECG data D3, and the series information D15 stored in the EPG/ECG/series information storage section 15, and generates series program viewing/recording status screen data D20 based on the detected results. The series program viewing/recording status screen data D20 is output to the external AV device 4 through the AV interface 406 to be presented to the user.

Next, the EPG, ECG, and series information will be described.

Figure 4:
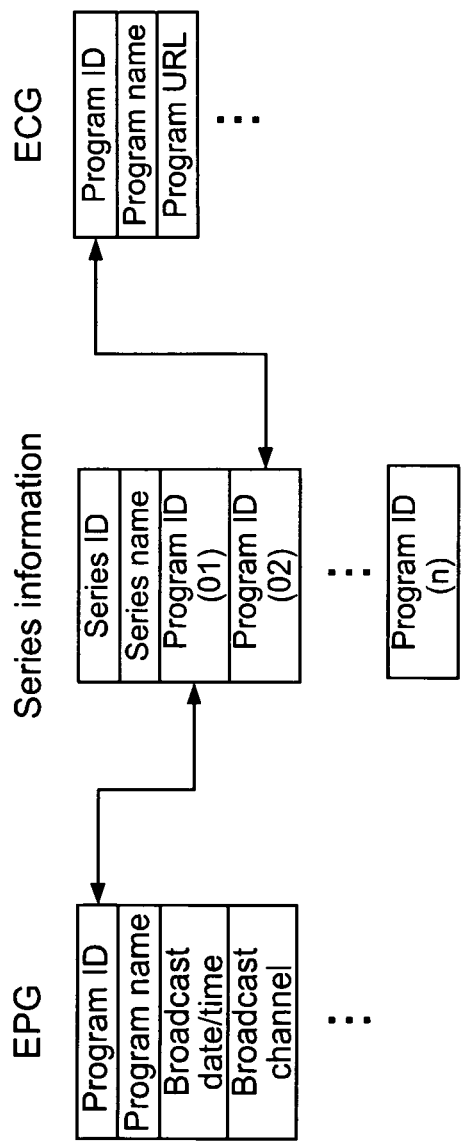
FIG. 4 is a diagram showing structures of EPG, ECG, and series information and their relationship.

FIG. 4 is a diagram showing structures of the EPG, ECG, and series information and their relationship.

As shown in FIG. 4, the EPG contains information such as a program ID, a program name, broadcast date/time, a broadcast channel, an IP multicast address (in the case of the IP multicast system), and so forth of a program broadcast from the broadcasting station 200 or a program delivered from the program delivery server 300 according to the IP multicast system. The ECG contains information such as a program ID, a program name, a URL as location information of program data, and so forth of a program that can be delivered from the program delivery server 300 according to the VOD system or the like. The series information contains a series ID, a series name, and a program ID of each of programs that belong to a series, and so forth. With respect to the program IDs, even if programs are delivered through different delivery systems, when their sources are the same, the programs are assigned the same program ID. Thus, even if a plurality of types of delivery systems co-exist, only one type of series information is necessary. In other words, a content of series information delivered from the broadcasting station 200 through broadcast waves is the same as that of series information delivered from the program delivery server 300. Thus, the recording apparatus 400 only needs to obtain the series information from any one of the broadcasting station 200, the program delivery server 300, and a dedicated server for delivering series information.

Timings at which series information is obtained are not restricted. For example, series information of a program may be obtained in an interlocking manner with program data thereof, or series information may be obtained in an interlocking manner with the EPG data or ECG data. Alternatively, series information may be obtained when the series program viewing/recording status detection section 23 has received the series program viewing/recording status referral request R8 from the user.

Next, an operation of the program delivery and recording system 100 of this embodiment will be described.

First, an operation for timer-recording a program will be described.

First, the user operates the input operation section 405 or the remote controller 5 to issue the display request R3 containing designation information of either the EPG or the ECG to the EPG/ECG screen generation section 16. When input with the display request R3 containing the EPG designation information, the EPG/ECG screen generation section 16 generates the EPG screen data D4 based on the EPG data D2 stored in the EPG/ECG/series information storage section 15, and outputs the EPG screen data D4 to the external AV device 4 such as a television set through the AV interface 406. As a result, the EPG is displayed on the screen of the external AV device 4. When input with the display request R3 containing the ECG designation information, the EPG/ECG screen generation section 16 generates the ECG screen data D14 based on the ECG data D3 stored in the EPG/ECG/series information storage section 15, and outputs the screen data D14 to the external AV device 4 such as the television set through the AV interface 406. As a result, the ECG is displayed on the screen of the external AV device 4.

When the user selects a program that he or she wishes to timer-record on the EPG screen or the ECG screen displayed on the external AV device 4 using the input operation section 405 or the remote controller 5 to thus issue a timer-recording command, a timer-recording request R4 containing information that designates the program is output from the input operation section 405 or the remote controller 5 to the EPG/ECG screen generation section 16. When the EPG/ECG screen generation section 16 receives the timer-recording request R4, the EPG/ECG screen generation section 16 extracts information necessary to obtain the relevant program from the EPG data D2 or the ECG data D3 based on the program designation information contained in the timer-recording request R4, and outputs a timer-recording request R1 containing such information to the timer-recording section 17. The timer-recording section 17 registers information necessary to obtain the program contained in the timer-recording request R1 in the timer-recording information storage section 24 as the timer-recording information D1 based on the timer-recording request R1. As a result, the timer-recording operation for the program is completed.

Next, an operation of recording programs and recording history information associated therewith will be described.

Figure 5:
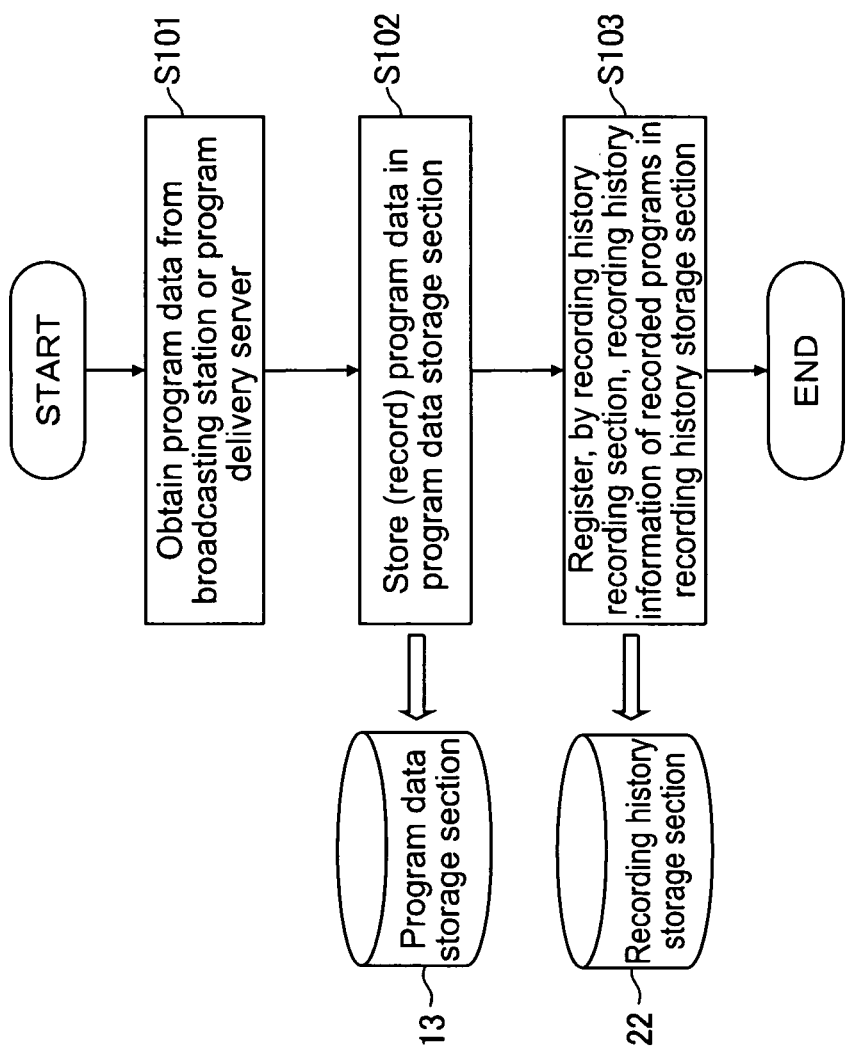
FIG. 5 is a flowchart with respect to an operation of recording a program and recording history information associated therewith.

FIG. 5 is a flowchart showing an operation of recording programs and recording history information associated therewith.

The program data recording section 12 outputs the program obtaining request R2 to the program data obtaining section 11 based on the timer-recording information D1 stored, for example, in the timer-recording information storage section 24. The program data obtaining section 11 obtains the program data D10 broadcast from the broadcasting station 200 or the program data D11 delivered from the program delivery server 300 based on the program obtaining request R2 received from the program data recording section 12 (Step S101). When the program to be recorded is the program data D10 broadcast from the broadcasting station 200, the program data obtaining section 11 controls the broadcast reception section 411 based on information such as a broadcast channel, a program ID, and a broadcast date/time contained in the program obtaining request R2 to obtain the program data D10 from the broadcasting station 200. When the program to be recorded is a program delivered from the program delivery server 300 according to the IP multicast system, the program data obtaining section 11 controls the network connection section 408 based on an IP multicast address, a program ID, broadcast date/time, and so forth contained in the program obtaining request R2 to obtain the program data D11 delivered from the program delivery server 300 through the network 1 according to the IP multicast system. When the program to be recorded is a program delivered from the program delivery server 300 according to a VOD system such as a streaming system or a download system, the program data obtaining section 11 controls the network connection section 408 based on location information, a program ID, and so forth contained in the program obtaining request R2 to obtain the program data D11 delivered from the program delivery server 300 through the network 1.

The program data obtaining section 11 outputs the program data D10 or D11 obtained from the broadcasting station 200 or the program delivery server 300 to the program data recording section 12. The program data recording section 12 stores the program data D10 or D11 obtained from the program data obtaining section 11 in the program data storage section 13 (Step S102).

After the program data D10 or D11 has been stored in the program data storage section 13, the program data recording section 12 obtains the information D12 about the program such as the program ID of the stored program data D10 or D11 from the EPG data D2 or the ECG data D3 stored in the EPG/ECG/series information obtaining section 14, and outputs the information D12 about the program to the recording history recording section 21. The recording history recording section 21 registers the information D12 about the program that has been input from the program data recording section 12 in the recording history storage section 22 as a new entry of the recording history information D22 (Step S103). Information registered as the recording history information D22 in the recording history storage section 22 includes information on a delivery system (for example, "broadcast" and "VOD"), a program ID, a program name, recording date/time, and so forth.

Next, an operation for program viewing and recording of viewing history information associated therewith will be described.

Figure 6:
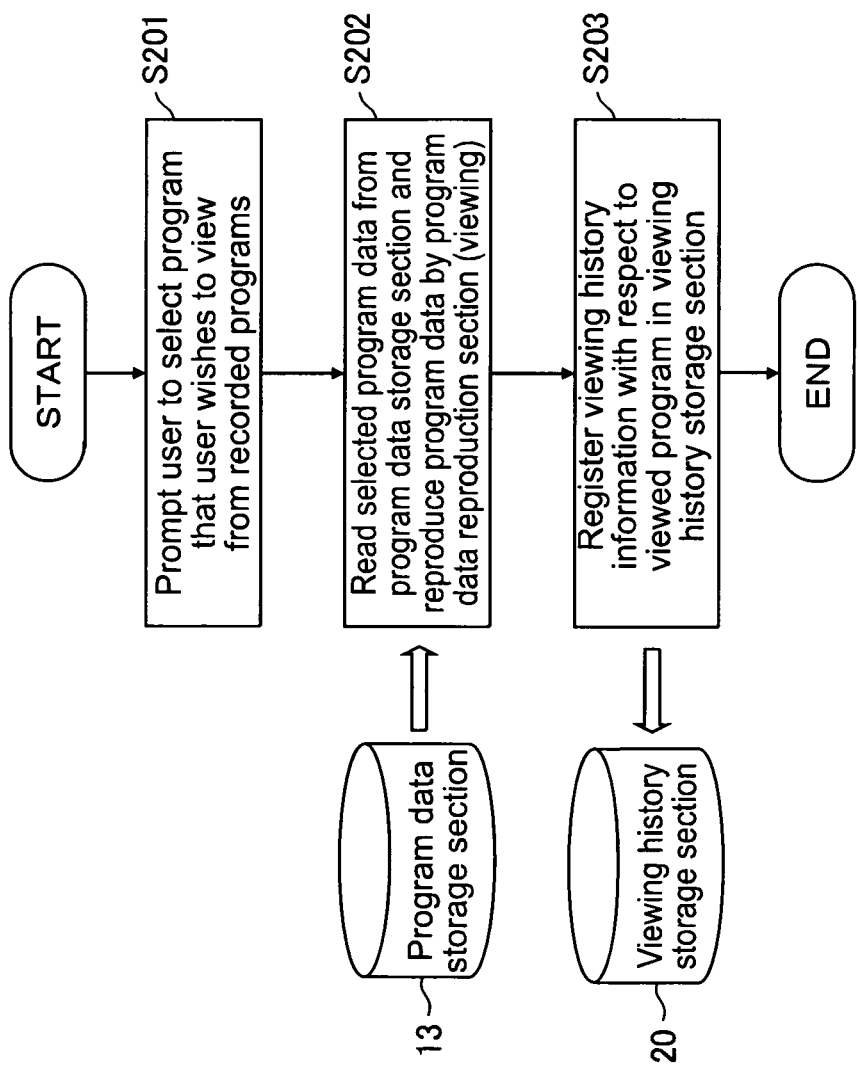
FIG. 6 is a flowchart with respect to an operation for program viewing and recording of viewing history information associated therewith.

FIG. 6 is a flowchart with respect to the operation for program viewing and recording of viewing history information associated therewith.

First, the user selects a program that he or she wishes to view from recorded programs stored in the program data storage section 13 (Step S201). In this case, the user selects a program that he or she wishes to view as follows. The user operates, for example, the input operation section 405 or the remote controller 5 to output the recorded program list output request R5 to the recorded program list generation section 25. When the recorded program list generation section 25 receives the recorded program list output request R5, the recorded program list generation section 25 generates the recorded program list D5 based on the information of the table that manages programs stored in the program data storage section 13, and outputs the recorded program list D5 to the external AV device 4 through the AV interface 406. When the user selects the program that he or she wishes to view from the recorded program list displayed on the external AV device 4 using the input operation section 405 or the remote controller 5 to thus issue a viewing command, the program viewing request R7 containing information such as a program ID or the like that specifies the program that the user wishes to view is output from the input operation section 405 or the remote controller 5 to the program data reproduction section 18.

When input with the program viewing request R7, the program data reproduction section 18 reads the relevant one of the program data D10 and D11 from the program data storage section 13, with the information such as a program ID contained in the program viewing request R7 as a key. The program data reproduction section 18 performs data processes such as decoding and error correction necessary for the reproduction of the read program data D10 or D11 and outputs video data and audio data as the reproduction data D16 to the external AV device 4 through the AV interface 406. As a result, the user can view the program (Step S202).

After completing the reproduction of the program data, the program data reproduction section 18 outputs a reproduction completion notification D6 containing information on the delivery system of the program (for example, "broadcast" and "VOD") and information such as a program ID, a program name, and a viewed date/time of the program to the viewing history recording section 19. When the viewing history recording section 19 receives the reproduction completion notification D6 from the program data reproduction section 18, the viewing history recording section 19 creates a new entry in the viewing history storage section 20 and registers the information on the delivery system and the information such as the program ID, program name, and viewed date/time contained in the reproduction completion notification D6 in the entry as the viewing history information D23 (Step S203).

Next, an operation of detecting viewing/recording statuses of at least one program that belongs to a series that the user intends to record based on the recording history information D22, the viewing history information D23, the EPG data D2, the ECG data D3, and the series information D15 will be described.

Figure 7:
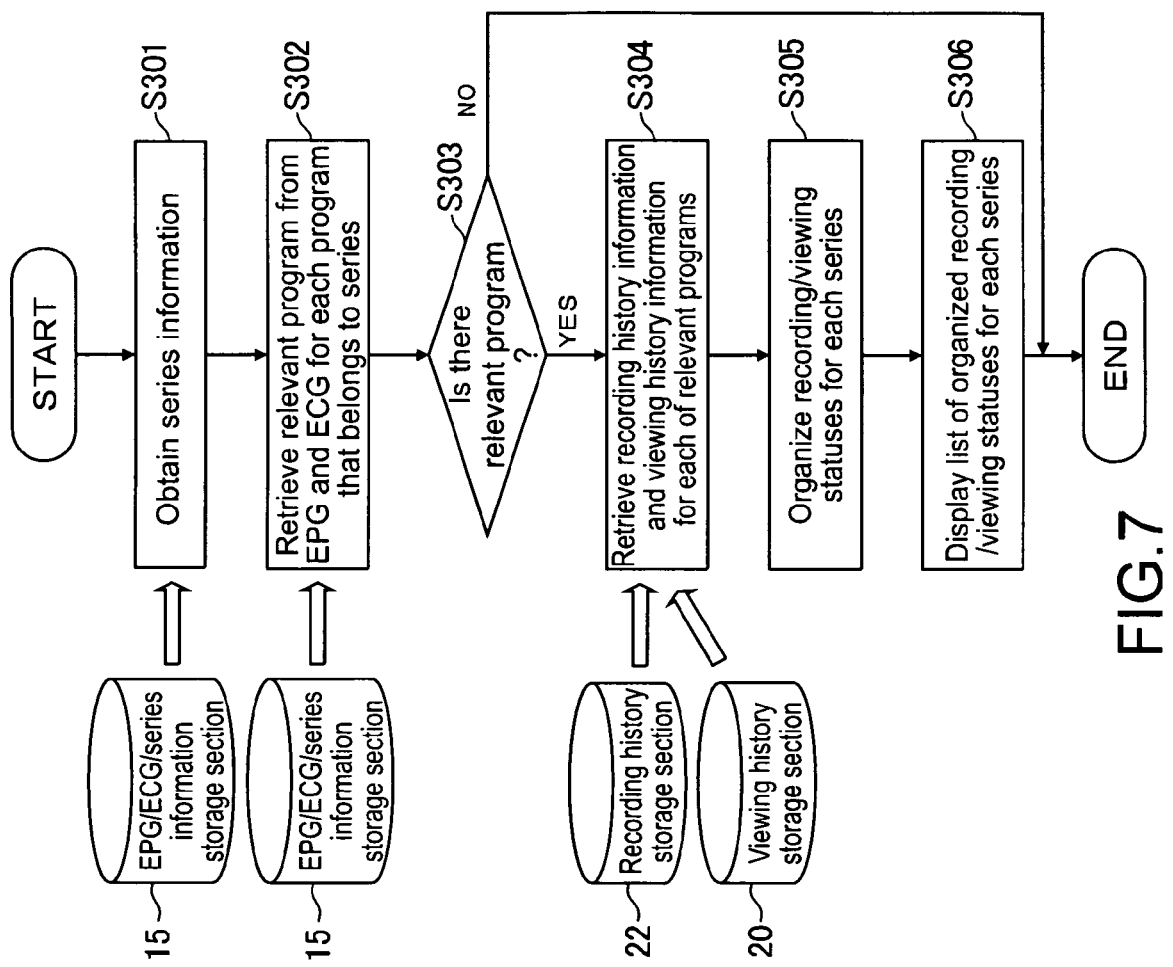
FIG. 7 is a flowchart with respect to an operation of detecting viewing/recording statuses of at least one program that belongs to a series that a user intends to record.

FIG. 7 is a flowchart showing an operation of detecting viewing/recording statuses of at least one program that belongs to a series that the user intends to record.

Upon input of a series program viewing/recording status referral request R8 from the user through the input operation section 405 or the remote controller 5, the series program viewing/recording status detection section 23 first obtains the series information D15 from the EPG/ECG/series information storage section 15 (Step S301).

Thereafter, the series program viewing/recording status detection section 23 retrieves all programs that belong to the same series from the EPG data D2 and the ECG data D3 stored in the EPG/ECG/series information storage section 15 (Step S302). Since the series information D15 contains program IDs of all programs that belong to the same series, the series program viewing/recording status detection section 23 can retrieve the programs that belong to the series from the EPG data D2 and the ECG data D3 based on the program ID.

When unable to retrieve the relevant program from the EPG data D2 and the ECG data D3 (No in Step S303), the series program viewing/recording status detection section 23 ends the process without any further step. When the relevant program has been retrieved from the EPG data D2 and the ECG data D3 (Yes in Step S303), the series program viewing/recording status detection section 23 retrieves the viewing history information D23 of the relevant program from the viewing history storage section 20 and the recording history information D22 of the relevant program from the recording history storage section 22 based on the program ID for each of the programs retrieved from the EPG data D2 and the ECG data D3. The series program viewing/recording status detection section 23 judges whether or not each program that belongs to the series has been viewed and has been timer-recorded based on the viewing history information D23 and the recording history information D22 of each of the relevant programs. Thus, information of viewing/recording statuses of at least one program that belongs to the series that the user intends to view is obtained (Step S304). In this case, a series that the user intends to view refers to a series of programs presumed that the user is intending to view or record.

Thereafter, the series program viewing/recording status detection section 23 organizes and edits information of viewing/recording statuses for each of the (one or more) programs that belong to the series that the user intends to view, and generates the series program viewing/recording status screen data D20 (Step S305). The series program viewing/recording status screen data D20 is output to the external AV device 4 through the AV interface 406 (Step S306). Thus, an output screen of viewing/recording statuses of at least one program that belongs to the series that the user intends to view is displayed on the external AV device 4.

Figure 8:
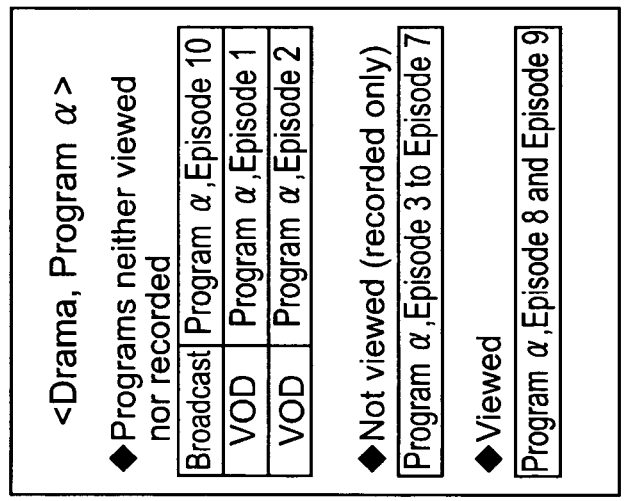
FIG. 8 is a diagram showing a first example of a series program viewing/recording status output screen.

FIG. 8 is a diagram showing a first example of the series program viewing/recording status output screen.

The series program viewing/recording status detection section 23 categorizes a plurality of programs that belong to a series that the user intends to view into programs that have never been viewed nor recorded, programs that have been recorded but not yet viewed, and programs that have been recorded and viewed based on the recording history information D22, the viewing history information D23, the EPG data D2, the ECG data D3, and the series information D15. The series program viewing/recording status detection section 23 organizes the pieces of information about the programs for each category and generates the series program viewing/recording status screen data D20.

In the example of the output screen shown in FIG. 8, a series with a series name "drama, Program α" has been detected as a series that the user intends to view. As programs that have been neither viewed nor recorded among the programs that belong to this series, three programs having program names "Program α, Episode 10", "Program α, Episode 1", and "Program α, Episode 2" have been detected. At least programs scheduled to be broadcast/delivered in the future are detected as programs that have been neither viewed nor recorded by the series program viewing/recording status detection section 23 and presented to the user through the output screen of the external AV device 4. Alternatively, programs that can be broadcast/delivered at present and have been neither viewed nor recorded are also presented to the user. As a result, the user can easily grasp, from among programs that belong to a series that he or she wishes to record and view, programs that are scheduled to be broadcast/delivered in the future and programs that are currently being delivered but have neither been recorded nor viewed.

The series program viewing/recording status output screen correlatively displays programs that have been neither recorded nor viewed with information indicating their delivery system like "broadcast" and "VOD". Thus, the user can grasp the delivery systems of the programs that have been neither recorded nor viewed at a glance, which is beneficial when timer-recording the programs.

Moreover, in the example of the series program viewing/recording status output screen shown in FIG. 8, five program names of "Program α, Episode 3 to Episode 7" are displayed as program names of programs that have been recorded but not yet viewed, and two program names of "Program α, Episode 8 and Episode 9" are displayed as program names of programs that have been recorded and viewed. Thus, the user can grasp programs that have and have not been viewed from among the recorded programs at a glance.

In the example of the series program viewing/recording status output screen of FIG. 8, only the program names and delivery systems of the programs that have been neither recorded nor viewed are displayed. Instead, other types of information, for example, a broadcast channel, broadcast date/time, delivery date/time, and so forth that can be obtained from the EPG/ECG may be displayed along with program names and delivery systems. If there are a plurality of series that the user intends to view, the output screen shown in FIG. 8 may be generated and displayed for each series.

Figure 9:
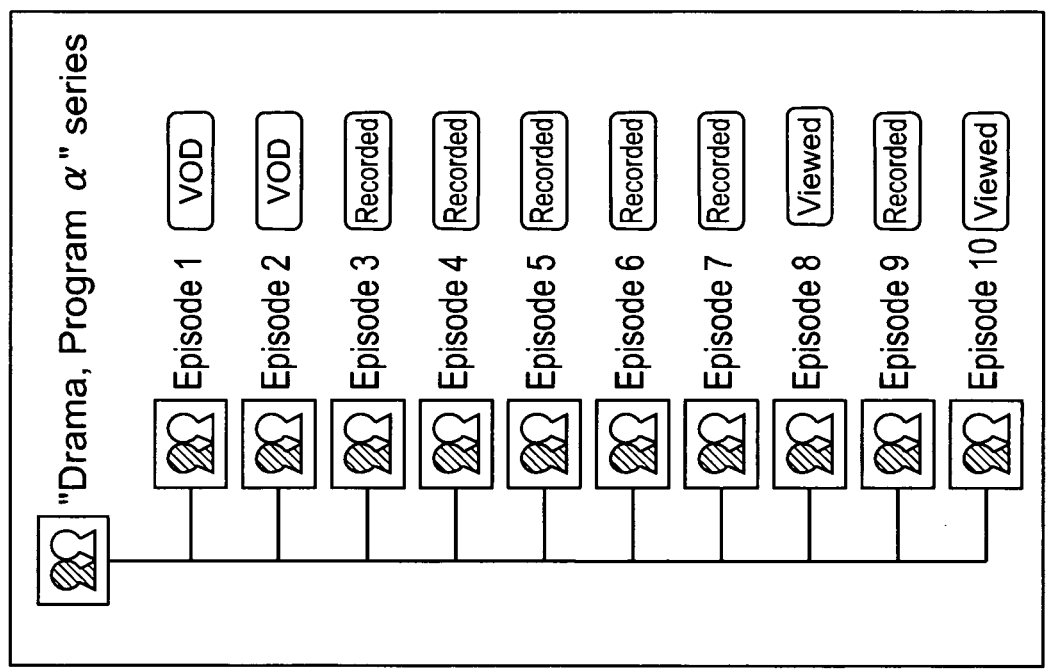
FIG. 9 is a diagram showing a second example of the series program viewing/recording status output screen.

FIG. 9 is a diagram showing a second example of the series program viewing/recording status output screen.

In this example, programs are not categorized based on viewing/recording statuses. Instead, the viewing/recording statuses of the one or more programs that belong to the series that the user intends to view are listed one by one in the order of the episodes. In this example, the viewing/recording statuses of the programs are represented using display information including character information exemplified by "VOD", "Broadcast", "Recorded", and "Viewed" and pictorial information so that the user can easily grasp the statuses. In this example, the display information of "VOD" indicates that the program has been neither viewed nor recorded and is scheduled to be delivered according to the VOD system or that the program is currently capable of being delivered according to the VOD system. The display information of "Broadcast" indicates that the program has been neither viewed nor recorded and is scheduled to be delivered through broadcast. The display information of "Recorded" indicates that the program has been recorded, but not yet viewed. The display information of "Viewed" indicates that the program has already been viewed. When the viewing/recording statuses of the one or more programs that belong to the series that the user intends to view are listed one by one in the order of the episodes, the user can grasp the viewing/recording statuses of the one or more programs that belong to the series that the user intends to view as a whole at a glance.

As described above, according to this embodiment, by detecting the viewing/recording statuses of at least one program that belongs to a series that the user intends to view based on the recording history information D22, the viewing history information D23, the EPG data D2, the ECG data D3, and the series information D15, a series of programs can favorably be recorded without being influenced by changes in scheduled broadcast/delivery dates/times.

In addition, according to this embodiment, the viewing/recording statuses of at least one program that belongs to the series that the user intends to view can be detected for a plurality of different delivery systems. Thus, even if the user who is intending to record a series of programs delivered according to a particular delivery system has failed to record a particular episode of the programs, if that episode is scheduled to be delivered according to another delivery system, the user can be notified of the schedule. Delivery systems include, for example, a terrestrial analog broadcast, a terrestrial digital broadcast, a BS broadcast, a CS broadcast, an IP multicast system, and a VOD system, but the present invention is not limited to such systems. In addition, the present invention is also not limited to such a method of selecting a plurality of different delivery systems.

In addition, the functional structure implemented in the recording apparatus 400 of the foregoing embodiment can be structured as a program such as an application program that causes a computer to operate as those functions. By storing the program in a computer-readable storage medium, the program can be distributed.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus, comprising:
   a guide information obtaining means for obtaining guide information of a program scheduled to be delivered;
   a series information obtaining means for obtaining series information for specifying a plurality of programs which belong to a series;
   a program data obtaining means for obtaining data of each of the plurality of programs;
   a program data storage section capable of storing the data of each of the plurality of programs;
   a program data recording means for storing the data of each of the plurality of programs obtained by the program data obtaining means in the program data storage section;
   a recording history storage section to store information about each of the plurality of programs whose data is stored in the program data storage section, as recording history information; and
   a detection means for detecting a recording status of at least one of the plurality of programs which belong to the series intended to be recorded, wherein the guide information obtaining means obtains the guide information according to a plurality of different delivery systems, wherein the program data obtaining means is capable of obtaining the data of each of the plurality of programs according to the plurality of delivery systems, wherein the detection means detects the recording status of at least one of the plurality of programs which belong to the series intended to be recorded based on the guide information according to the plurality of delivery systems obtained by the guide information obtaining means, the series information obtained by the series information obtaining means, and the recording history information stored in the recording history storage section, and wherein the detection means outputs information indicating (i) each respective program that belongs to the series arranged in an intended viewing order from a first program of the series to a last program of the series, (ii) whether said each respective program has been recorded or viewed, and (iii) a respective delivery system for said each respective program and (iv) pictorial information.

2. The recording apparatus as set forth in claim 1, further comprising:
a reproduction means for reproducing the data of each of the plurality of programs stored in the program data storage section; and
a viewing history storage section to store information about the data of each of the plurality of programs reproduced by the reproduction means as viewing history information.

3. The recording apparatus as set forth in claim 1, in which the guide information obtaining means obtains the guide information from a first guide or a second guide.

4. The recording apparatus as set forth in claim 3, in which the first guide is an electronic program guide (EPG) and the second guide is an electronic content guide (ECG).

5. A recording status detection method, comprising:
obtaining guide information of a program scheduled to be delivered;
obtaining series information for specifying a plurality of programs which belong to a series;
obtaining data of each of the plurality of programs;
storing the obtained data of each of the plurality of programs in a program data storage section;
storing information about each of the plurality of programs whose data is stored in the program data storage section, as recording history information; and
detecting a recording status of at least one of the plurality of programs which belong to the series intended to be recorded,
wherein the obtaining guide information, the obtaining series information, the obtaining data, the storing the obtained data, the storing information, and the detecting are performed by a recording apparatus,
wherein the obtaining guide information obtains the guide information according to a plurality of different delivery systems,
wherein the obtaining data is capable of obtaining the data of each of the plurality of programs according to the plurality of delivery systems, and
wherein the detecting detects the recording status of at least one of the plurality of programs which belong to the series intended to be recorded based on the guide information according to the plurality of delivery systems, the obtained series information, and the stored recording history information, and said method further comprising outputting information indicating (i) each respective program that belongs to the series arranged in an intended viewing order from a first program of the series to a last program of the series, (ii) whether said each respective program has been recorded or viewed, (iii) a respective delivery system for said each respective program and (iv) pictorial information.

6. A program delivery and recording system, comprising:
a program delivery apparatus capable of delivering data of a program;
a guide information delivery apparatus capable of delivering guide information of a program scheduled to be delivered;
a series information delivery apparatus capable of delivering series information for specifying a plurality of programs which belong to a series; and
a recording apparatus capable of recording the data of each of the plurality of programs delivered from the program delivery apparatus, the recording apparatus including
a guide information obtaining means for obtaining the guide information delivered from the guide information delivery apparatus;
a series information obtaining means for obtaining the series information delivered from the series information delivery apparatus;
a program data obtaining means for obtaining data of each of the plurality of programs delivered from the program delivery apparatus;
a program data storage section capable of storing the data of each of the plurality of programs;
a program data recording means for storing the data of each of the plurality of programs obtained by the program data obtaining means in the program data storage section;
a recording history storage section to store information about each of the plurality of programs whose data is stored in the program data storage section, as recording history information, and
a detection means for detecting a recording status of at least one of the plurality of programs which belong to the series intended to be recorded,
wherein the guide information obtaining means obtains the guide information according to a plurality of different delivery systems,
wherein the program data obtaining means is capable of obtaining the data of each of the plurality of programs according to the plurality of delivery systems,
wherein the detection means detects the recording status of at least one of the plurality of programs which belong to the series intended to be recorded based on the guide information according to the plurality of delivery systems obtained by the guide information obtaining means, the series information obtained by the series information obtaining means, and the recording history information stored in the recording history storage section, and
wherein the detection means outputs information indicating (i) each respective program that belongs to the series arranged in an intended viewing order from a first program of the series to a last program of the series, (ii) whether said each respective program has been recorded or viewed, (iii) a respective delivery system for said each respective program and (iv) pictorial information.

7. A non-transitory computer-readable storage medium having stored thereon a program causing a computer to operate as:

a guide information obtaining means for obtaining guide information of a program scheduled to be delivered;

a series information obtaining means for obtaining series information for specifying a plurality of programs which belong to a series;

a program data obtaining means for obtaining data of each of the plurality of programs;

a program data storage section capable of storing the data of each of the plurality of programs;

a program data recording means for storing the data of each of the plurality of programs obtained by the program data obtaining means in the program data storage section;

a recording history storage section to store information about each of the plurality of programs whose data is stored in the program data storage section, as recording history information; and a detection means for detecting a recording status of at least one of the plurality of programs which belong to the series intended to be recorded, wherein the guide information obtaining means obtains the guide information according to a plurality of different delivery systems, wherein the program data obtaining means is capable of obtaining the data of each of the plurality of programs according to the plurality of delivery systems, wherein the detection means detects the recording status of at least one of the plurality of programs which belong to the series intended to be recorded based on the guide information according to the plurality of delivery systems obtained by the guide information obtaining means, the series information obtained by the series information obtaining means, and the recording history information stored in the recording history storage section, and wherein the detection means outputs information indicating (i) each respective program that belongs to the series arranged in an intended viewing order from a first program of the series to a last program of the series, (ii) whether said each respective program has been recorded or viewed, (iii) a respective delivery system for said each respective program and (iv) pictorial information.

* * * * *